United States Patent
Matono et al.

(10) Patent No.: US 6,700,740 B2
(45) Date of Patent: Mar. 2, 2004

(54) THIN-FILM MAGNETIC HEAD AND METHOD OF MANUFACTURING SAME

(75) Inventors: Naoto Matono, Hong Kong (CN); Tetsuya Kuwashima, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 162 days.

(21) Appl. No.: 09/924,550

(22) Filed: Aug. 9, 2001

(65) Prior Publication Data

US 2002/0030930 A1 Mar. 14, 2002

(30) Foreign Application Priority Data

Aug. 22, 2000 (JP) ........................................ 2000-250736

(51) Int. Cl.[7] .............................................. G11B 5/147
(52) U.S. Cl. ....................................................... 360/126
(58) Field of Search .......................................... 360/126

(56) References Cited

U.S. PATENT DOCUMENTS 6,501,618 B1 * 12/2002 Kamijima et al. .......... 360/126

* cited by examiner

Primary Examiner—A. J. Heinz
(74) Attorney, Agent, or Firm—Oliff & Berridge PLC

(57) ABSTRACT

A top pole layer has a first portion and a second portion. The first portion has an end located in an air bearing surface, has a constant width equal to a write track width, and includes a pole portion. The second portion is coupled to the other end of the first portion and includes a yoke portion. The first portion, a write gap layer, and a part of the bottom pole layer closer to the write gap layer have an equal width in a region where the first portion of the top pole layer and the bottom pole layer are opposed to each other via the write gap layer. The thickness of the first portion of the top pole layer in a region extending from the air bearing surface to a predetermined position is smaller than the thickness of the other part of the top pole layer adjacent to this region.

5 Claims, 13 Drawing Sheets

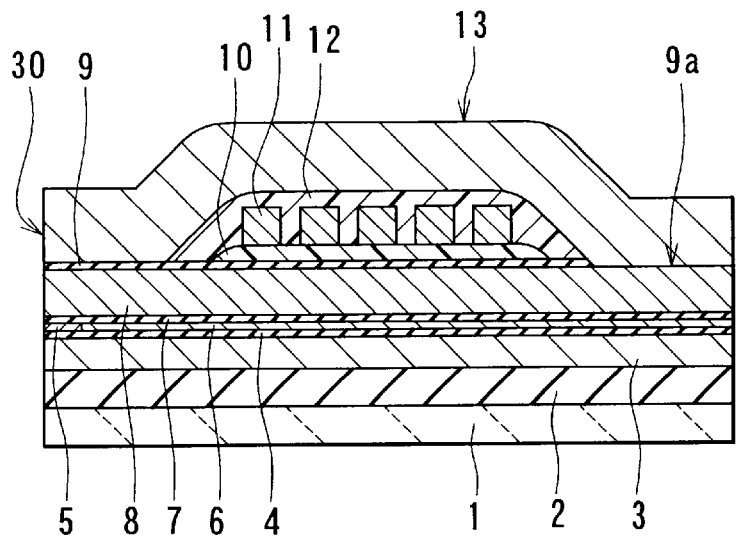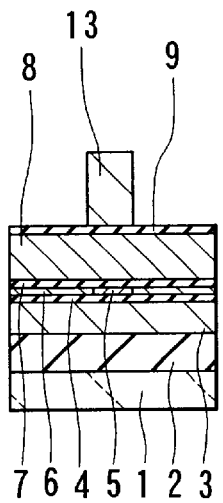
FIG. 4A  FIG. 4B
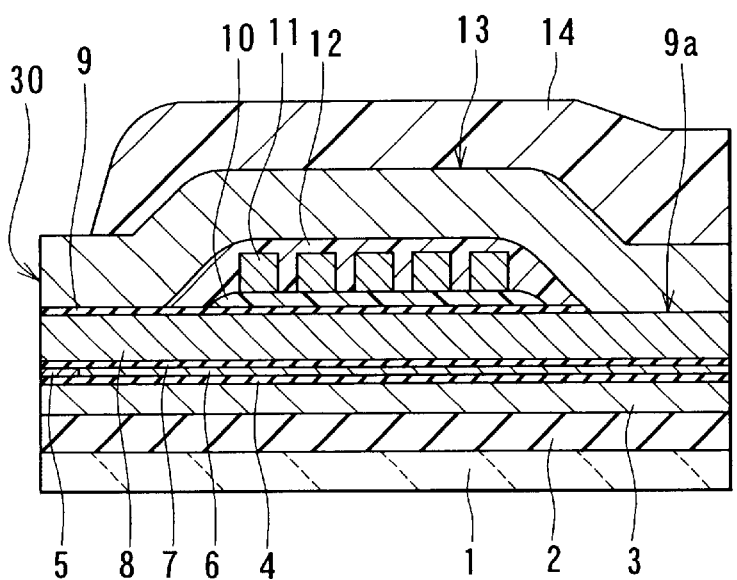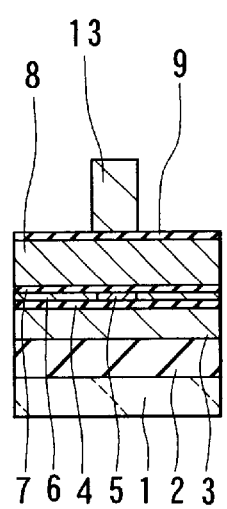
FIG. 5A  FIG. 5B

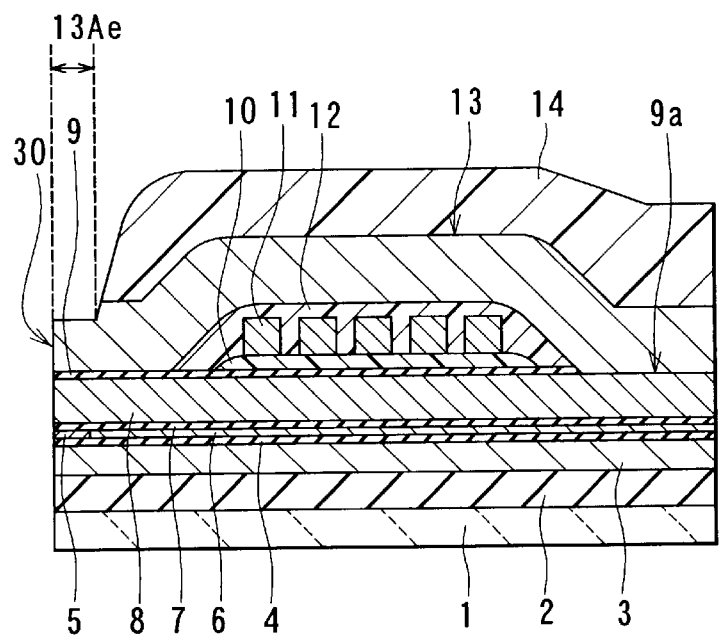
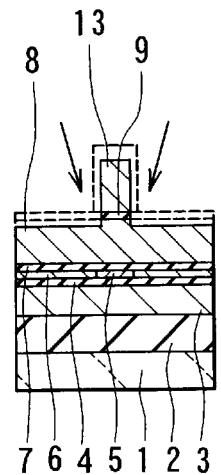
FIG. 6A  FIG. 6B
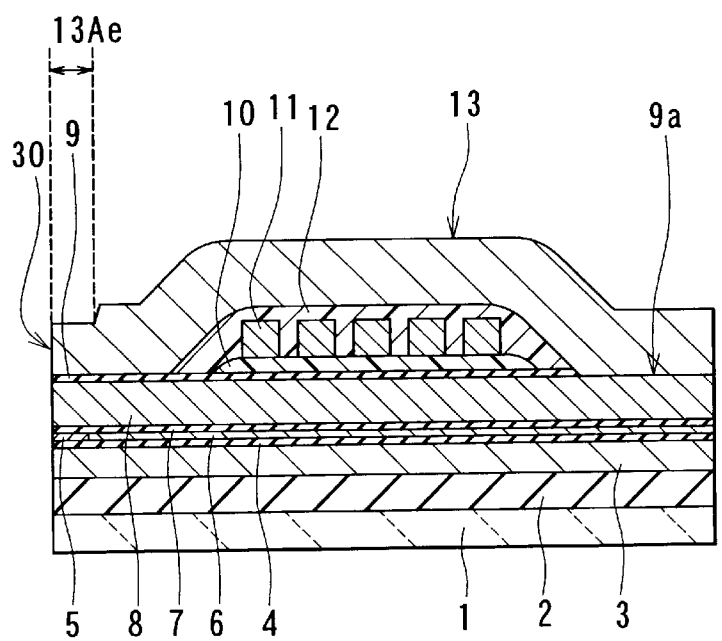
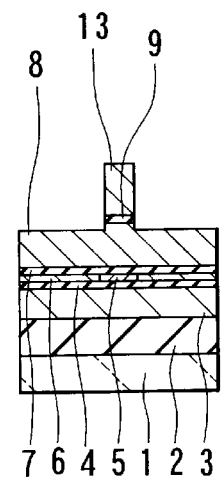
FIG. 7A  FIG. 7B

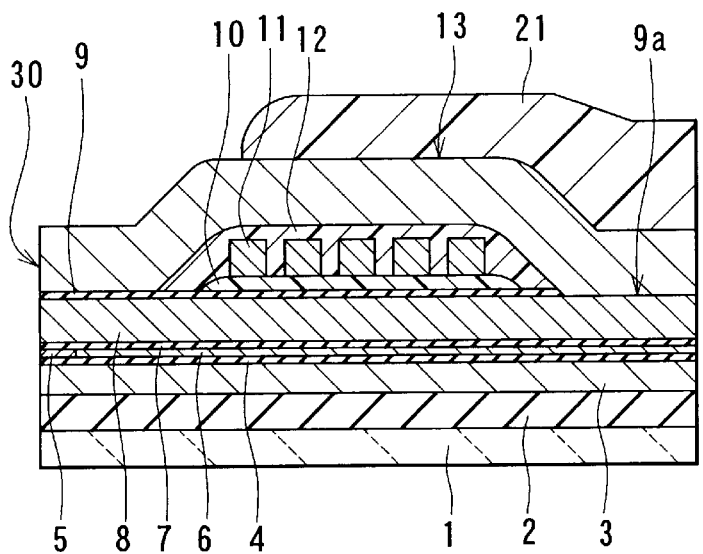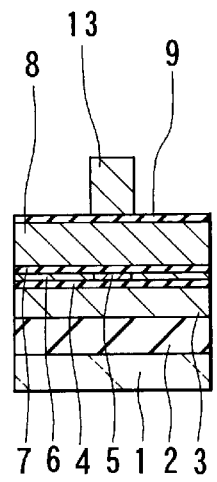
FIG. 14A  FIG. 14B
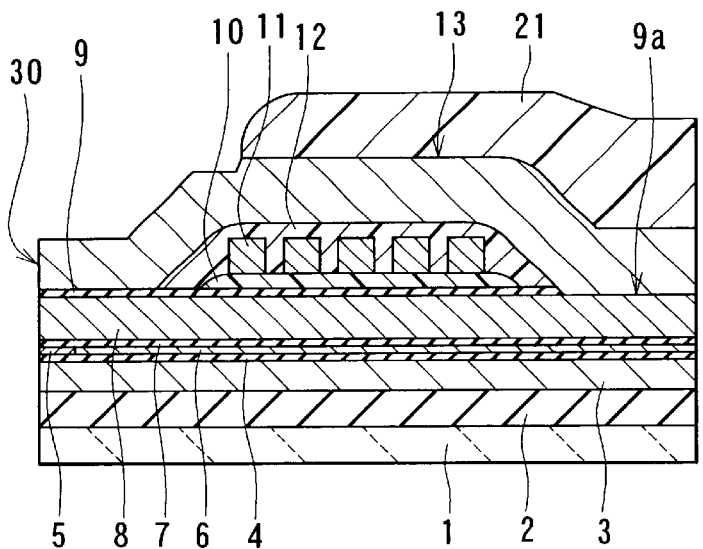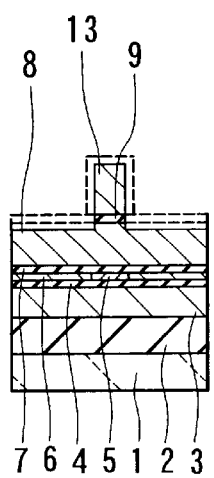
FIG. 15A  FIG. 15B

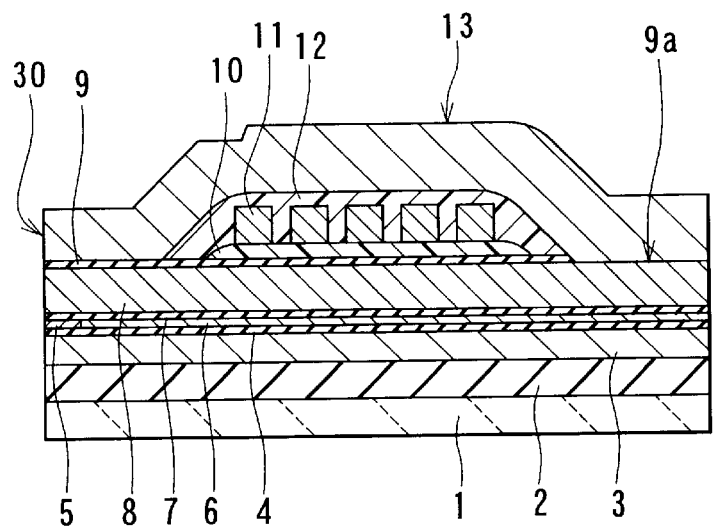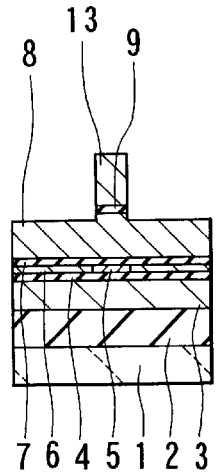
FIG. 16A  FIG. 16B
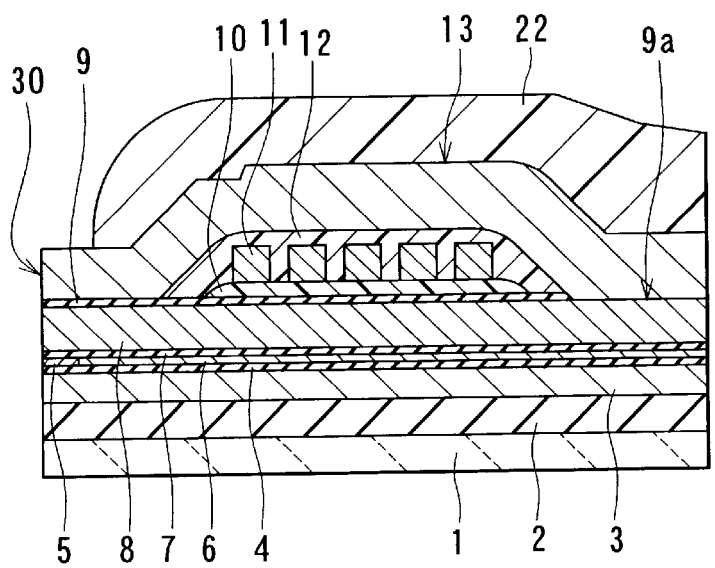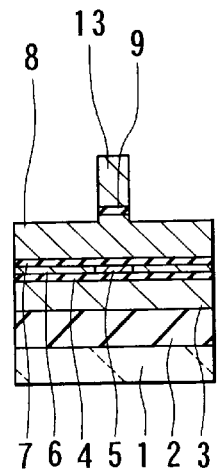
FIG. 17A  FIG. 17B

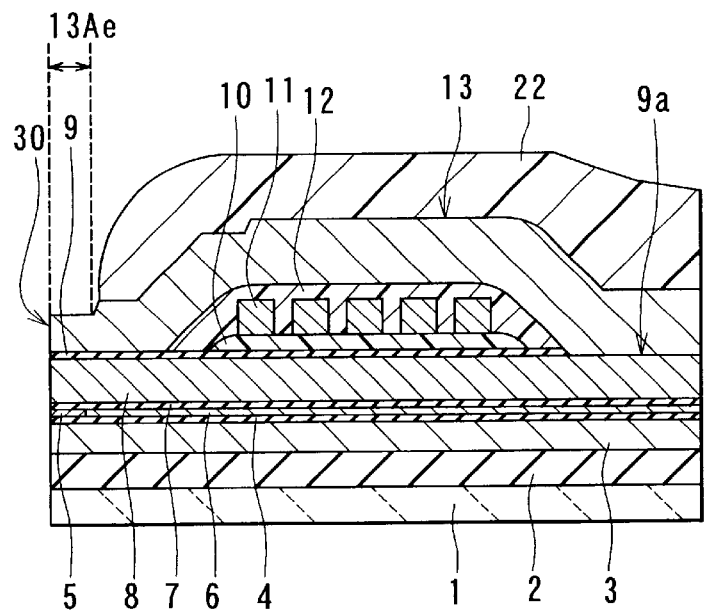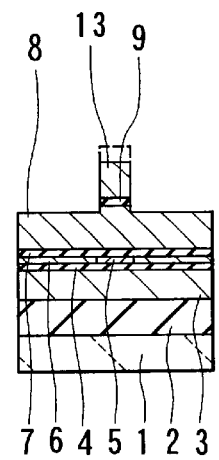
FIG. 18A  FIG. 18B
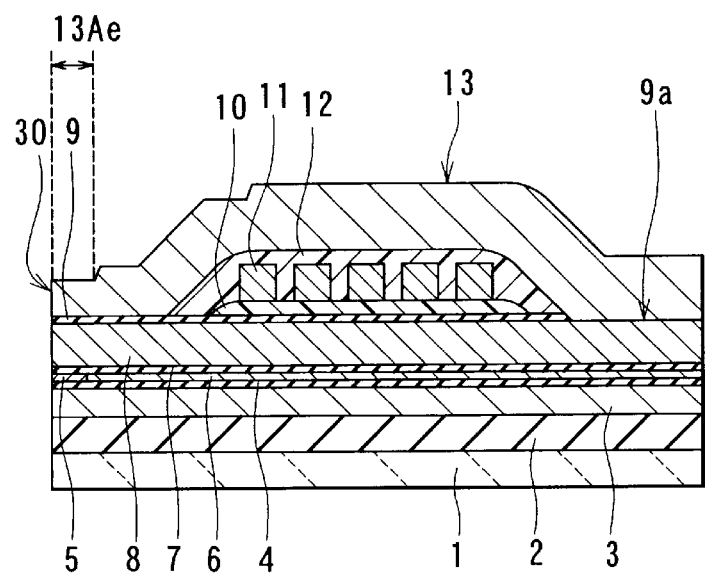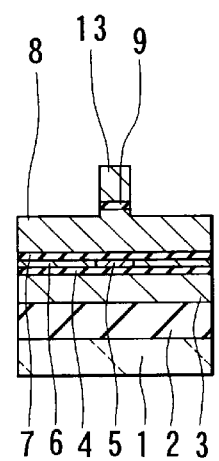
FIG. 19A  FIG. 19B

THIN-FILM MAGNETIC HEAD AND METHOD OF MANUFACTURING SAME

BACKGROUND OF THE INVENTION

1. Field of the Invention

The invention relates to a thin-film magnetic head having at least an induction-type electromagnetic transducer and a method of manufacturing the same.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a write head having an induction-type electromagnetic transducer for writing and a read head having a magnetoresistive element (hereinafter, also referred to as MR element) for reading.

The write head comprises: a bottom pole layer and a top pole layer including pole portions that are opposed to each other and placed in regions on a side of an air bearing surface; a write gap layer provided between the pole portion of the bottom pole layer and the pole portion of the top pole layer; and a thin-film coil arranged such that at least a part thereof is insulated from the bottom pole layer and the top pole layer.

It is required to increase the track density on a magnetic recording medium in order to increase recording density among the performance characteristics of a write head. To achieve this, it is required to implement a write head of a narrow track structure wherein the width of the pole portions of the bottom and top pole layers on a side of the air bearing surface, that is a write track width, is reduced down to microns or the order of submicron. Semiconductor process techniques are utilized to implement such a structure.

Additionally, in order to prevent an increase in effective write track width due to magnetic flux expansion in between the pole portion of the bottom pole layer and the pole portion of the top pole layer, there has conventionally been adopted a structure in which the pole portion of the top pole layer and at least a part of the pole portion of the bottom pole layer are given an equal width. This structure is referred to as a trim structure.

FIG. 21 is a perspective view showing an example of the structure in the vicinity of the pole portions of a write head. In this example, a write gap layer 109 is formed on a bottom pole layer 108. A thin-film coil that is not shown and an insulating layer 112 for covering the thin-film coil are formed on the write gap layer 109. An end of the insulating layer 112 closer to an air bearing surface 130 is located at a predetermined distance from the air bearing surface 130, thereby defining a throat height. The throat height is the length (height) of portions of two pole layers facing each other with the write gap layer in between, as taken from the end closer to the air bearing surface 130 to the other end. A top pole layer 113 is formed on the write gap layer 109 and the insulating layer 112.

The top pole layer 113 has: a first portion 113A that includes the pole portion; and a second portion 113B that includes a yoke portion. The width of the first portion 113A is constant and equal to the write track width. The width of the second portion 113B is equal to the width of the first portion 113A at the interface with the first portion 113A. It gradually grows wider as the distance from the air bearing surface 130 increases, and then becomes constant.

A part of the first portion 113A is laid on the write gap layer 109, the part extending from the end of the first portion 113A located in the air bearing surface 130 to a position corresponding to the end of the insulating layer 112 closer to the air bearing surface 130. The other part of the first portion 113A is laid on the insulating layer 112. The second portion 113B is mostly laid on the insulating layer 112. The second portion 113B, at a part near its end farther from the air bearing surface 130, is connected to the bottom pole layer 108 through a contact pole formed in the write gap layer 109.

In a region where the first portion 113A of the top pole layer 113 and the bottom pole layer 108 are opposed to each other with the write gap layer 109 in between, a trim structure is formed, that is a structure in which the first portion 113A, the write gap layer 109, and a part of the bottom pole layer 108 closer to the write gap layer 109 have an equal width.

The trim structure as shown in FIG. 21 is formed, for example, by the following steps. That is, the second portion 113B of the top pole layer 113 is initially covered partially with an etching mask made of a photoresist, from a position halfway through its spreading part to the side farther from the air bearing surface 130. Next, the write gap layer 109 and a part of the bottom pole layer 108 closer to the write gap layer 109 are etched by dry etching. Here, the first portion 113A of the top pole layer 113 not covered with the etching mask is used as a mask. For example, reactive ion etching is used for etching the write gap layer 109; ion beam etching (ion milling) is used for etching the bottom pole layer 108.

In the thin-film magnetic head shown in FIG. 21, the first portion 113A of the top pole layer 113 has a constant thickness.

Now, if the width of the first portion 113A of the top pole layer 113, that is, the write track width, falls to 1 $\mu$m or below, for example, the magnetic flux may be saturated halfway through the first portion 113A, possibly precluding the efficient use of magnetomotive force generated by the thin-film coil for writing.

To avoid this, the first portion 113A of the top pole layer 113 can be increased in thickness. Hard disk drives, however, have some skew between the direction perpendicular to the surfaces of the bottom and top pole layers 108, 113 and the track direction. This results in a problem that the increased thickness of the first portion 113A of the top pole layer 113 can cause so-called side write, which means that data is written in regions of a recording medium where data is not supposed to be written, and so-called side erase, which means that data is erased from regions where data is not supposed to be written.

OBJECT AND SUMMARY OF THE INVENTION

An object of the present invention is to provide a thin-film magnetic head and a method of manufacturing the same, capable of preventing magnetic flux saturation in the middle of the magnetic path and preventing data from being written/ erased in regions where data is not supposed to be written, even at smaller track widths.

A thin-film magnetic head according to the present invention comprises: a medium facing surface that faces toward a recording medium; a first magnetic layer and a second magnetic layer magnetically coupled to each other and including pole portions that are opposed to each other and placed in regions of the magnetic layers on a side of the medium facing surface; a gap layer provided between the pole portions of the first and second magnetic layers; and a thin-film coil at least a part of which is placed between the first and second magnetic layers and insulated from the first and second magnetic layers. Here, the second magnetic layer has a first portion and a second portion. The first portion has an end located in the medium facing surface, has a constant width equal to a write track width, and includes the pole portion. The second portion is coupled to the other end of the first portion and includes a yoke portion, The thickness of the first portion in a region extending from the end of the first portion located in the medium facing surface to a predetermined position is smaller than the thickness of the other part of the second magnetic layer adjacent to that region.

A method of manufacturing a thin-film magnetic head according to the present invention is provided for manufacturing a thin-film magnetic head comprising: a medium facing surface that faces toward a recording medium; a first magnetic layer and a second magnetic layer magnetically coupled to each other and including pole portions that are opposed to each other and placed in regions of the magnetic layers on a side of the medium facing surface; a gap layer provided between the pole portions of the first and second magnetic layers; and a thin-film coil at least a part of which is placed between the first and second magnetic layers and insulated from the first and second magnetic layers. The method comprises the steps of:

forming the first magnetic layer;

forming the gap layer on the first magnetic layer;

forming the second magnetic layer on the gap layer; and forming the thin-film coil such that the at least part thereof is placed between the first and second magnetic layers and insulated from the first and second magnetic layers. Here, the second magnetic layer is formed to have a first portion and a second portion. The first portion has an end located in the medium facing surface, has a constant width equal to a write track width, and includes the pole portion. The second portion is coupled to the other end of the first portion and includes a yoke portion. The thickness of the first portion in a region extending from the end of the first portion located in the medium facing surface to a predetermined position is made smaller than the thickness of the other part of the second magnetic layer adjacent to that region.

In the thin-film magnetic head or the method of manufacturing the same according to the present invention, the thickness of the first portion in the above-mentioned region is smaller than the thickness of the other part of the second magnetic layer adjacent to that region. This makes it possible to reduce the thickness of the first portion in the medium facing surface while preventing magnetic flux saturation halfway through the magnetic path of the second magnetic layer.

In the thin-film magnetic head or the method of manufacturing the same according to the present invention, the thickness of the first portion in the above-mentioned region may fall within a range of 30% to 95% the thickness of the other part of the second magnetic layer adjacent to that region.

In the thin-film magnetic head or the method of manufacturing the same according to the present invention, the predetermined position may be located within a range that extends from a position 0.5 $\mu$m away from the end of the first portion located in the medium facing surface to the interface between the first and second portions.

In the thin-film magnetic head or the method of manufacturing the same according to the present invention, the predetermined position may be located within a range that extends from a position at a distance of one seventh the length of the first portion from the end of the first portion located in the medium facing surface to the interface between the first and second portions.

In the thin-film magnetic head or the method of manufacturing the same according to the present invention, at least a part of the pole portion of the first magnetic layer closer to the gap layer may have a width equal to the width of the first portion.

In the method of manufacturing a thin-film magnetic head according to the present invention, a layer to be the second magnetic layer may be partially etched so that the thickness of the first portion in the above-mentioned region is made smaller than the thickness of the other part of the second magnetic layer adjacent to that region. Here, the etching may be effected by dry etching using an etching mask, or by local etching using no etching mask.

The method of manufacturing a thin-film magnetic head according to the present invention may further comprise a trimming step in which at least a part of the pole portion of the first magnetic layer closer to the gap layer is etched using at least a part of the first portion adjacent to the medium facing surface as a mask, so that at least a part of the pole portion of the first magnetic layer closer to the gap layer has a width equal to the width of the first portion.

In the method of manufacturing a thin-film magnetic head according to the present invention, in the trimming step a layer to be the second magnetic layer may be partially etched concurrently, so that the thickness of the first portion in the above-mentioned region is made smaller than the thickness of the other part of the second magnetic layer adjacent to that region. Here, the etching may be effected by dry etching using an etching mask.

In the method of manufacturing a thin-film magnetic head according to the present invention, the layer to be the second magnetic layer may be partially etched after the trimming step, so that the thickness of the first portion in the above-mentioned region is made smaller than the thickness of the other part of the second magnetic layer adjacent to that region. Here, both the etching in the trimming step and the etching of the layer to be the second magnetic layer may be effected by dry etching using an etching mask. Alternatively, the etching in the trimming step may be effected by dry etching using an etching mask while the etching of the layer to be the second magnetic layer may be effected by local etching using no etching mask.

The other objects, features, and advantages of the present invention will become fully apparent from the following description.

BRIEF DESCRIPTION OF THE DRAWINGS

FIGS. 4A and 4B are cross-sectional views for explaining a step in a method of manufacturing a thin-film magnetic head according to the first embodiment of the present invention.

FIGS. 5A and 5B are cross-sectional views for explaining a step that follows FIGS. 4A and 4B.

FIGS. 6A and 6B are cross-sectional views for explaining a step that follows FIGS. 5A and 5B.

FIGS. 7A and 7B are cross-sectional views for explaining a step that follows FIGS. 6A and 6B.

FIGS. 14A and 14B are cross-sectional views for explaining a step in a method of manufacturing a thin-film magnetic head according to the second embodiment of the present invention.

FIGS. 15A and 15B are cross-sectional views for explaining a step that follows FIGS. 14A and 14B.

FIGS. 16A and 16B are cross-sectional views for explaining a step that follows FIGS. 15A and 15B.

FIGS. 17A and 17B are cross-sectional views for explaining a step that follows FIGS. 16A and 16B.

FIGS. 18A and 18B are cross-sectional views for explaining a step that follows FIGS. 17A and 17B.

FIGS. 19A and 19B are cross-sectional views for explaining a step that follows FIGS. 18A and 18B.

DETAILED DESCRIPTION OF THE PREFERRED EMBODIMENTS

Preferred embodiments of the invention will now be described in detail with reference to the drawings.

[First Embodiment]

Figures 1A, 1B:
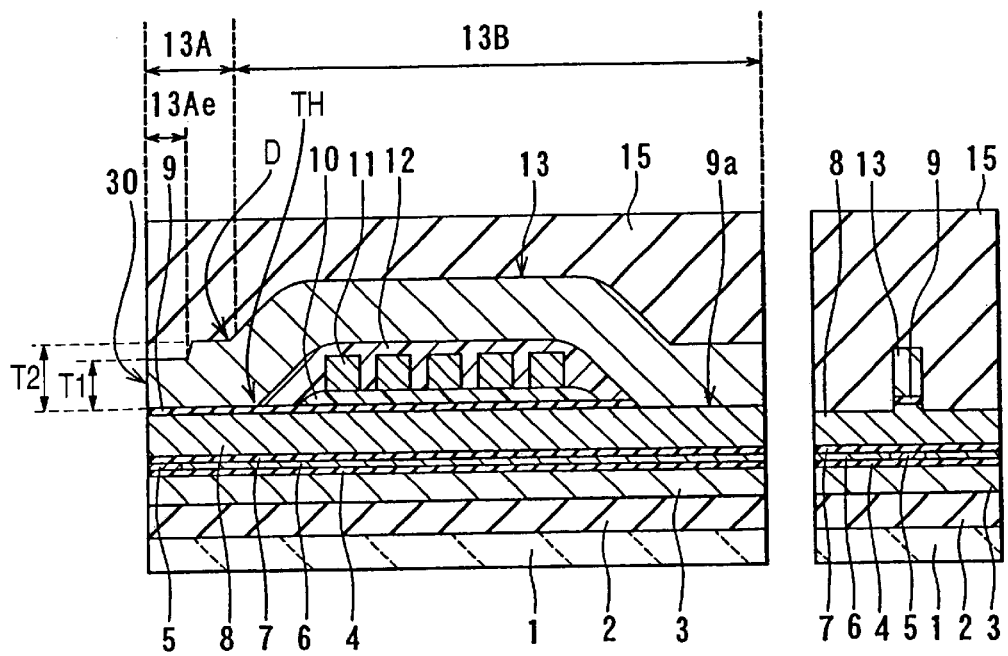
FIGS. 1A and 1B are cross-sectional views of a thin-film magnetic head according to a first embodiment of the present invention.
Figure 2:
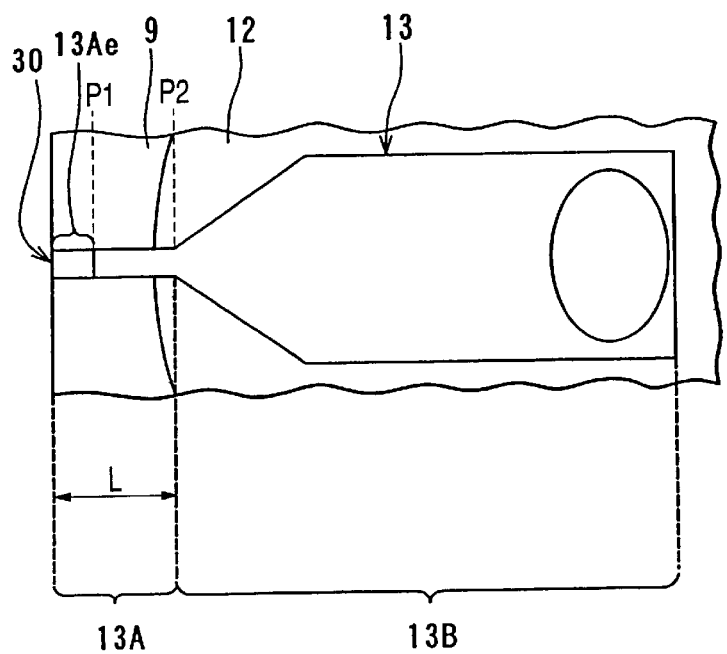
FIG. 2 is a plan view showing the shape of a top pole layer according to the first embodiment of the present invention.
Figure 3:
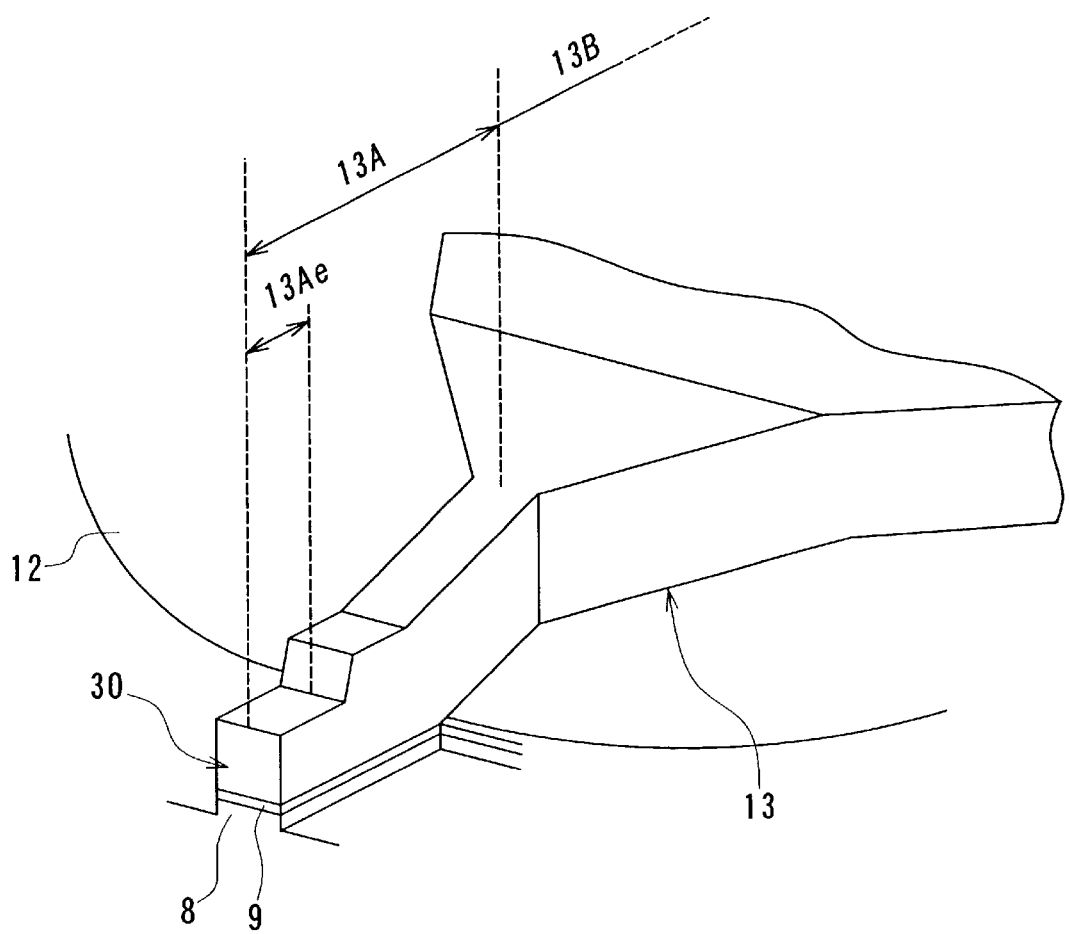
FIG. 3 is a perspective view showing the shape of the top pole layer according to the first embodiment of the present invention.

Reference is now made to FIGS. 1A, 1B, 2 and 3 to describe a thin-film magnetic head according to a first embodiment of the invention. FIGS. 1A and 1B are cross-sectional views of the thin-film magnetic head according to the present embodiment. FIG. 1A shows a cross section orthogonal to an air bearing surface, and FIG. 1B shows a cross section of pole portion parallel to the air bearing surface. FIG. 2 is a plan view showing the shape of a top pole layer in the present embodiment. FIG. 3 is a perspective view showing the shape of the top pole layer in the present embodiment.

The thin-film magnetic head according to the present embodiment comprises: a substrate 1 made of a ceramic material such as aluminum oxide and titanium carbide ($Al_2O_3$—TiC); an insulating layer 2 made of an insulating material and formed on the substrate 1; a read head formed on the insulating layer 2; a write head formed on the read head; and a protective layer 15 to cover the write head. Besides, the thin-film magnetic head has an air bearing surface 30 that serves as the medium facing surface that faces toward a recording medium.

The read head comprises a bottom shield layer 3, a bottom shield gap film 4, an MR element (magnetoresistive element) 5 for reading, a pair of electrode layers 6, a top shield gap film 7, and a top-shield-layer-cum-bottom-pole-layer (hereinafter referred to as a bottom pole layer) 8. The bottom shield layer 3 is made of a magnetic material and is formed on the insulating layer 2. The bottom shield gap film 4 is made of an insulating material and is formed on the bottom shield layer 3. The MR element 5 is formed on the bottom shield gap film 4 so that an end thereof is located in the air bearing surface 30. The electrode layers 6 are formed on the bottom shield gap film 4 and electrically connected to the MR element 5. The top shield gap film 7 is formed so as to cover the bottom shield gap film 4, the MR element 5 and the electrode layers 6. The bottom pole layer 8 is made of a magnetic material and is formed on the top shield gap film 7. The MR element 5 may be an element made of a magnetosensitive film that exhibits a magnetoresistive effect, such as an anisotropic magnetoresistive (AMR) element, a giant magnetoresistive (GMR) element, and a tunnel magnetoresistive (TMR) element.

The write head comprises the bottom pole layer 8, a write gap layer 9, an insulating layer 10, a thin-film coil 11, an insulating layer 12, and a top pole layer 13 for making the write head. The write gap layer 9 is made of an insulating material and is formed on the bottom pole layer 8. The insulating layer 10 is formed on the write gap layer 9 over an area where the thin-film coil 11 is to be formed. The thin-film coil 11 is made of a conductive material and is formed on the insulating layer 10. The insulating layer 12 is formed so as to cover the thin-film coil 11, and to gradually rise from a level of a top surface of the write gap layer 9. The top pole layer 13 is made of a magnetic material and is formed on the write gap layer 9 and the insulating layer 12. The protective layer 15 is made of an insulating material such as alumina and is formed to cover the top pole layer 13. An end TH of the insulating layer 12 closer to the air bearing surface 30 is located at a predetermined distance from the air bearing surface 30, thereby defining the throat height.

A pole portion of the bottom pole layer 8, which is a part of the same close to the air bearing surface 30, and a pole portion of the top pole layer 13, which is a part of the same close to the air bearing surface 30, are opposed to each other, with the write gap layer 9 placed in between. The pole portion of the top pole layer 13 has a width equal to the write track width. The end of the top pole layer 13 farther from the air bearing surface 30 is connected and magnetically coupled to the bottom pole layer 8 through a contact hole 9a which is formed in the write gap layer 9. The thin-film coil 11 is wound around the contact hole 9a.

As described above, the thin-film magnetic head according to the present embodiment has the medium facing surface (air bearing surface 30) that faces toward a recording medium, the read head and the write head. The read head includes the MR element 5, and the bottom shield layer 3 and the top shield layer (bottom pole layer 8) for shielding the MR element 5, the shield layers having portions that are located on a side of the air bearing surface 30 and opposed to each other, the MR element 5 being located between these portions.

The write head has: the bottom pole layer 8 and the top pole layer 13 magnetically coupled to each other and including the pole portions that are opposed to each other and placed in regions of the pole layers on the side of the air bearing surface 30; the write gap layer 9 provided between the pole portion of the bottom pole layer 8 and the pole portion of the top pole layer 13; and the thin-film coil 11 at least a part of which is placed between the bottom pole layer 8 and the top pole layer 10 and insulated from those pole layers.

In the present embodiment, the bottom pole layer 8 corresponds to the first magnetic layer of the invention, and the top pole layer 13 corresponds to the second magnetic layer of the invention. The top pole layer 13 yet to be etched corresponds to the layer to be the second magnetic layer of the invention.

As shown in FIGS. 2 and 3, the top pole layer 13 has a first portion 13A and a second portion 13B. The first portion 13A has an end located in the air bearing surface 30, has a constant width equal to the write track width, and includes the pole portion. The second portion 13B is coupled to the other end of the first portion 13A and includes a yoke portion. The width of the second portion 13B is equal to the width of the first portion 13A at the interface with the first portion 13A. It gradually grows wider as the distance from the air bearing surface 30 increases, and then becomes constant.

A part of the first portion 13A is laid on the write gap layer 9, the part extending from the end of the first portion 13A located in the air bearing surface 30 to a position corresponding to the end of the insulating layer 12 closer to the air bearing surface 30. The other part of the first portion 13A is laid on the insulating layer 12. The second portion 13B is mostly laid on the insulating layer 12. The second portion 13B, at a part near its end farther from the air bearing surface 30, is connected to the bottom pole layer 8 through the contact hole 9a.

In a region where the first portion 13A of the top pole layer 13 and the bottom pole layer 8 are opposed to each other with the write gap layer 9 in between, a trim structure is formed, that is a structure in which the first portion 13A, the write gap layer 9, and at least a part of the bottom pole layer 8 closer to the write gap layer 9 have an equal width.

The top pole layer 13 is disposed on the write gap layer 9 and the insulating layer 12. The top surface of the top pole layer 13 is thereby bent at a point D near the end TH of the insulating layer 12. The point D at which the top surface of the top pole layer 13 is bent is located closer to the air bearing surface 30 than the end TH. The region 13Ae is located closer to the air bearing surface 30 than the point D.

The thickness T1 of the first portion 13A of the top pole layer 13, in a region 13Ae, is smaller than the thickness T2 of the other part of the top pole layer 13 adjacent to this region 13Ae. The region 13Ae extends from the air bearing surface 30 to a predetermined position P1. The thickness T1 of the first portion 13A in the region 13Ae preferably falls within a range of 30% to 95% the thickness T2 of the other part of the top pole layer 13 adjacent to the region 13Ae.

The above-mentioned predetermined position (hereinafter referred to as a thickness changing position) P1 that defines the region 13Ae is preferably located within a range that extends from a position 0.5 μm away from the air bearing surface 30 to the interface P2 between the first and second portions 13A and 13B, in terms of absolute figures of distance. Expressing the distance in the ratio to the length L of the first portion 13A (length along a direction perpendicular to the air bearing surface 30), the thickness changing position P1 is preferably located within a range that extends from a position at a distance of one seventh the length L of the first portion 13A from the air bearing surface 30 to the interface P2 between the first and second portions 13A and 13B.

Reference is now made to FIGS. 4A to 7A and FIGS. 4B to 7B to describe a method of manufacturing the thin-film magnetic head according to the present embodiment. FIGS. 4A to 7A show cross sections each orthogonal to the air bearing surface. FIGS. 4B to 7B show cross sections of the pole portions each parallel to the air bearing surface.

In the method of manufacturing a thin-film magnetic head according to the present embodiment, as shown in FIGS. 4A and 4B, the insulating layer 2 made of an insulating material such as alumina ($Al_2O_3$) and silicon dioxide ($SiO_2$) is initially formed through sputtering or otherwise to a thickness of, e.g., 1 to 20 μm on the substrate 1 made of a ceramic material such as aluminum oxide and titanium carbide ($Al_2O_3$—TiC). Next, the bottom shield layer 3 intended for the read head is formed to a thickness of, e.g., 0.1 to 5 μm on the insulating layer 2. The bottom shield layer 3 may be made of a magnetic material such as FeAlSi, NiFe, CoFe, CoFeNi, FeN, FeZrN, FeTaN, CoZrNb, and CoZrTa. The bottom shield layer 3 is formed by sputtering, plating, or the like.

Then, the bottom shield gap film 4 made of an insulating material such as $Al_2O_3$ and $SiO_2$ is formed by sputtering or the like to a thickness of, e.g., 10 to 200 nm on the bottom shield layer 3. On the bottom shield gap film 4, the MR element 5 for reading is formed by sputtering or the like to a thickness of, e.g., several tens of nanometers. A pair of the electrode layers 6 to be electrically connected to the MR element 5 is then formed to a thickness of several tens of nanometers by sputtering or the like on the bottom shield gap film 4. Then, the top shield gap film 7 made of an insulating material such as $Al_2O_3$ and $SiO_2$ is formed by sputtering or the like to a thickness of, e.g., 10 to 200 nm on the bottom shield gap film 4 and the MR element 5.

The foregoing layers making up the read head are patterned by a typical etching method or lift-off method using patterned resist layers, or a combination thereof.

Next, on the top shield gap film 7, the bottom pole layer 8 made of a magnetic material is formed to a thickness of, e.g., 0.5 to 4.0 μM. The bottom pole layer 8 is used for both the read head and the write head. Here, the bottom pole layer 8 is made of a soft magnetic material such as NiFe, CoFe, CoFeNi, and FeN. The bottom shield layer 8 is formed by sputtering, plating, or the like.

Next, the write gap layer 9 made of an insulating material such as $Al_2O_3$ and $SiO_2$ is formed by sputtering or the like to a thickness of, e.g., 10 to 500 nm on the bottom pole layer 8. A portion of the write gap layer 9 located in a center portion of the thin-film coil to be detailed later is then etched off to form the contact hole 9a for making a magnetic path.

Next, the insulating layer 10 made of, e.g., a heat-cured photoresist, is formed on the write gap layer 9 over an area where the thin-film coil is to be formed. On the insulating layer 10, the thin-film coil 11 made of a conductive material such as Cu is formed by frame plating or the like. The insulating layer 12 made of, e.g., a heat-cured photoresist, is then formed to cover the insulating layer 10 and the thin-film coil 11. The thin-film coil 11 is wound around the contact hole 9a.

Next, the top pole layer 13 made of a magnetic material, intended for the write head, is formed to a thickness of, e.g., 3 to 5 μm so as to extend from the air bearing surface 30 to the contact hole 9a over the insulating layer 12. Here, the top pole layer 13 is made of a soft magnetic material such as NiFe, CoFe, CoFeNi, and FeN.

Portions of the bottom pole layer 8 and the top pole layer 13 that are located on a side of the air bearing surface 30 and opposed to each other via the write gap layer 9 are the pole portions of the bottom and top pole layers 8 and 13. In the present embodiment, the pole portion of the top pole layer 13 has a width equal to the write track width, thereby defining the write track width. The bottom pole layer 8 and the top pole layer 13 are magnetically coupled to each other through the contact hole 9a. As has been described, the top pole layer 13 has the first portion 13A, and the second portion 13B.

A part of the first portion 13A, the part extending from the end of the first portion 13A located in the air bearing surface 30 to the position corresponding to the end of the insulating layer 12 closer to the air bearing surface 30, is laid on the write gap layer 9. The other part of the first portion 13A is laid on the insulating layer 12. The second portion 13B is mostly laid on the insulating layer 12. The second portion 13B, at a part near its end farther from the air bearing surface 30, is connected to the bottom pole layer 8 through the contact hole 9a.

Figure 8:
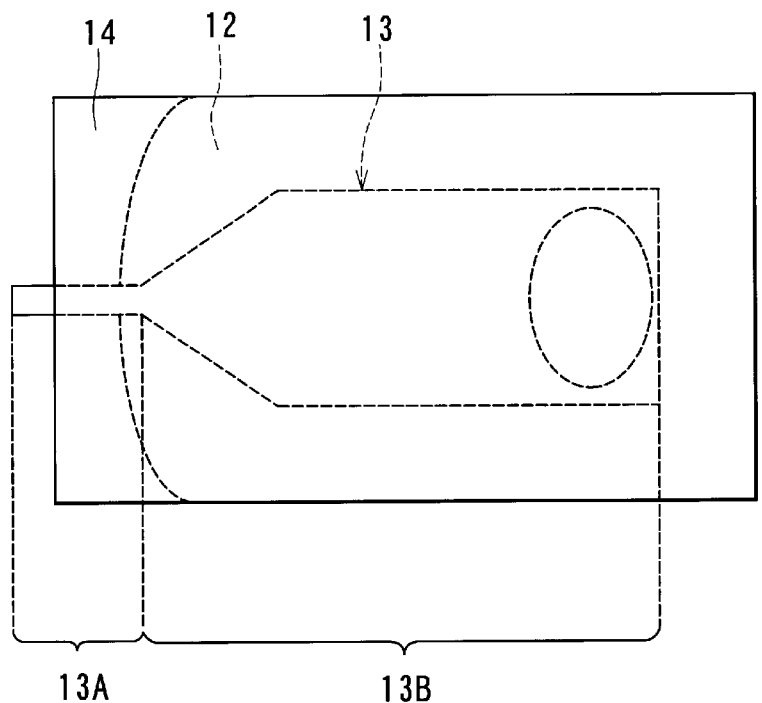
FIG. 8 is a plan view of the laminate in the state of FIGS. 5A and 5B.

Next, as shown in FIGS. 5A and 5B, the top pole layer 13 is covered with an etching mask 14 made of a photoresist, over an area that extends from the predetermined position (the position to be the thickness changing position) on the first portion 13A to the side farther from the air baring surface 30. FIG. 8 is a plan view of the laminate in the state of FIGS. 5A and 5B. The predetermined position is preferably located within a range that extends from a position 0.5 μm away from the air bearing surface 30 to the interface between the first and second portions 13A and 13B, in terms of absolute figures of distance. Expressing the distance in the ratio to the length of the first portion 13A (length along a direction perpendicular to the air bearing surface 30), the predetermined position is preferably located within a range that extends from a position at a distance of one seventh the length of the first portion 13A from the air bearing surface 30 to the interface between the first and second portions 13A and 13B.

Next, as shown in FIGS. 6A and 6B, the write gap layer 9 and at least a part of the pole portion of the bottom pole layer 8 closer to the write gap layer 9 are etched by dry etching using an etching mask. Here, the part of the first portion 13A of the top pole layer 13 that is not covered by the etching mask 14 is used as the mask. In this case, for example, reactive ion etching is used for etching the write gap layer 9, and ion beam etching (ion milling) is used for etching the bottom pole layer 8. This etching step corresponds to the trimming step of the present invention.

By the etching described above, in a region where the first portion 13A of the top pole layer 13 and the bottom pole layer 8 are opposed to each other with the write gap layer 9 in between, a trim structure is formed, that is a structure in which the first portion 13A, the write gap layer 9, and at least a part of the bottom pole layer 8 closer to the write gap layer 9 have an equal width. At the same time, the first portion 13A of the top pole layer 13 is partially etched at its top surface over a region 13Ae that extends from the air bearing surface 30 to the predetermined position. As a result, the thickness of the first portion 13A in the region 13Ae becomes smaller than the thickness of the other part of the top pole layer 13 adjacent to the region 13Ae. The thickness of the first portion 13A in the region 13Ae preferably falls within a range of 30% to 95% that of the other part of the top pole layer 13 adjacent to the region 13Ae.

Next, as shown in FIGS. 7A and 7B, the etching mask 14 is removed. Then, as shown in FIGS. 1A and 1B, the protective layer 15 made of an insulating material such as $Al_2O_3$ and $SiO_2$ is formed over the entire surface by sputtering or the like to a thickness of, e.g., 5 to 50 μm, The top surface is flattened, and pads (not shown) for electrodes are formed thereon. Finally, lapping of the slider including the foregoing layers is performed to form the air bearing surfaces 30 of the read head and the write head. The thin-film magnetic head according to the present embodiment is thus completed.

Now, description will be given of the results of experiments performed to determine the preferable range of the thickness changing position which defines the region 13Ae of the first portion 13A and the preferable range of a pole portion thickness ratio. Here, the pole portion thickness ratio refers to the ratio of the thickness of the first portion 13A in the region 13Ae to the thickness of the other part of the top pole layer 13 adjacent to the region 13Ae.

Figure 9:
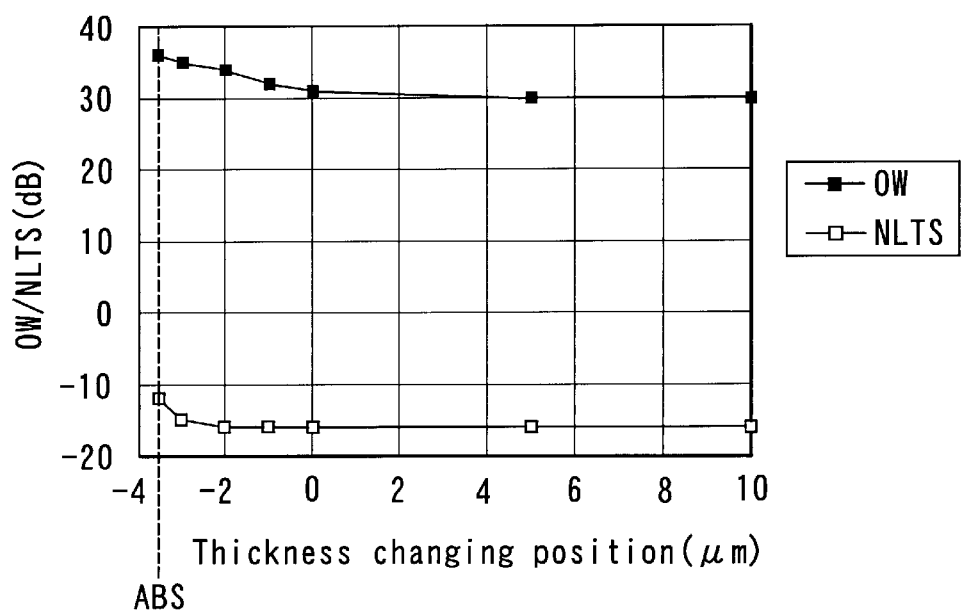
FIG. 9 is a plot showing an example of the result of an experiment for examining the relationships of a thickness changing position to an overwrite property and NLTS in the first embodiment of the present invention.

FIG. 9 is a plot showing an example of the result of an experiment for examining the relationships of the thickness changing position to an overwrite property (shown as OW in the drawings) that is a parameter indicating one of characteristics when data is written over existing data, and to a non-linear transition shift (hereinafter referred to as NLTS). Here, the thickness changing position is expressed in distances from the interface between the first and second portions 13A and 13B. The overwrite property is preferably greater, and NLTS smaller. In FIG. 9, the thickness changing position is shown in negative values when falling on the side closer to the air bearing surface 30 with respect to the interface between the first and second portions 13A and 13B. It is shown in positive values when falling on the side farther from the air bearing surface 30 with respect to the interface. In the example shown in FIG. 9, the first portion 13A was given a length of 3.5 μm. FIG. 9 indicates the position of the air bearing surface 30 with a symbol ABS. In the example shown in FIG. 9, the other part of the top pole layer 13 adjacent to the region 13Ae was given a thickness of 4.5 μm, and the region 13Ae of the first portion 13A a thickness of 3.0 μm. This means that the pole portion thickness ratio is approximately 67%.

As can be seen from FIG. 9, with reference to the properties for the case of no change in the thickness of the first portion 13A (the properties at the position marked with the symbol ABS in FIG. 9), NLTS improved when the thickness changing position was 0.5 μm away from the air bearing surface 30. Here, the overwrite property somewhat deteriorated but maintained a sufficient value of above 30 dB. As the thickness changing position got away from the air bearing surface 30 beyond the foregoing position to reach the interface between the first and second portions 13A and 13B, NLTS improved further and the overwrite property deteriorated further. Even in this range, the overwrite property maintained a sufficient value of above 30 dB. When the thickness changing position got farther from the air bearing surface 30 beyond the interface between the first and second portions 13A and 13B, however, the overwrite property deteriorated with no further improvement in NLTS.

Accordingly, in terms of absolute figures of distance, it is preferred that the thickness changing position is located within the range that extends from the position 0.5 μm away from the air bearing surface 30 to the interface between the first and second portions 13A and 13B. Expressing the distance in the ratio to the length of the first portion 13A (3.5 μm in the example of FIG. 9), it is preferred that the thickness changing position is located within a range that extends from a position at a distance of one seventh the length of the first portion 13A from the air bearing surface 30 to the interface between the first and second portions 13A and 13B.

Figure 10:
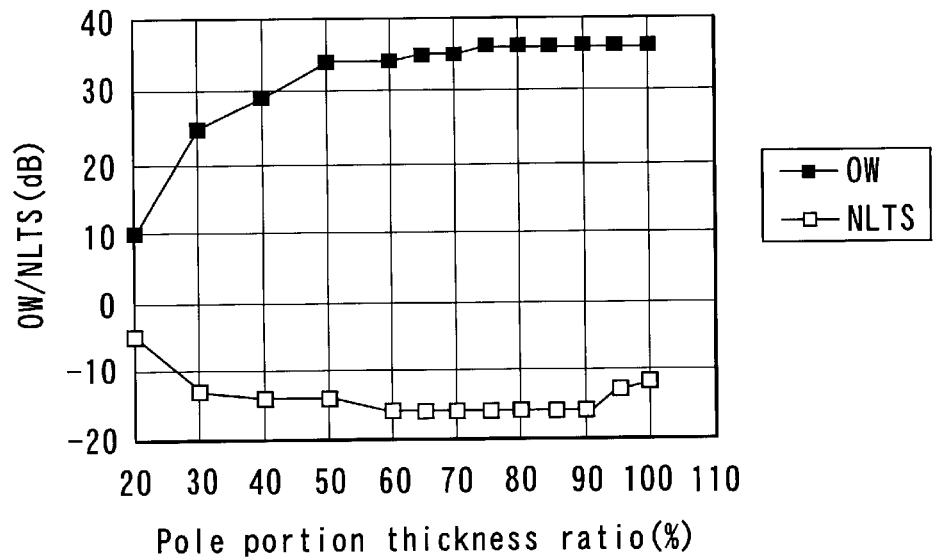
FIG. 10 is a plot showing an example of the result of an experiment for examining the relationships of a pole portion thickness ratio to the overwrite property and NLTS in the first embodiment of the present invention.

FIG. 10 is a plot showing an example of the result of an experiment for examining the relationships of the pole portion thickness ratio to the overwrite property and NLTS. In the example shown in FIG. 10, the other part of the top pole layer 13 adjacent to the region 13Ae was given a thickness of 4.5 μm. The thickness changing position was 1 μm off the interface between the first and second portions 13A and 13B, on the side closer to the air bearing surface 30.

As can be seen from FIG. 10, with reference to the case of a pole portion thickness ratio of 100%, i.e., the case of no change in the thickness of the first portion 13A, a pole portion thickness ratio of 95% improved NLTS and hardly deteriorated the overwrite property. As the pole portion thickness ratio fell from 95% down to 30%, NLTS made improvement as compared to the case of the pole portion thickness ratio of 100%. When the pole portion thickness ratio fell below 30%, however, NLTS deteriorated with reference to the case of the pole portion thickness ratio of 100%. Meanwhile, the overwrite property maintained a sufficient value of above 30 dB when the pole portion thickness ratio was 50% or higher. When the pole portion thickness ratio fell below 50%, however, the overwrite property deteriorated greatly. More specifically, the overwrite property falls to approximately 30 dB at a pole portion thickness ratio of 40%. When the pole portion thickness ratio fell below 40%, the overwrite property deteriorated further.

Accordingly, to place importance to the improvement of NLTS, it is preferred that the pole portion thickness ratio falls within the range of 30% to 95%. With consideration given to both the improvement of NLTS and the prevention of a deterioration in overwrite property, it is preferred that the pole portion thickness ratio falls within the range of 40% to 95%, and more preferably within the range of 50% to 95%.

As has been described, in the present embodiment, the thickness of the first portion 13A of the top pole layer 13, in the region 13Ae that extends from the air bearing surface 30 to the predetermined position, is made smaller than that of the other part of the top pole layer 13 adjacent to this region 13Ae. This makes it possible to increase the thickness of the top pole layer 13 in portions other than the region 13Ae while reducing the thickness of the first portion 13A on the air bearing surface 30. Therefore, according to the present embodiment, it is possible to reduce the write track width while preventing magnetic flux being saturated in the middle of the magnetic path and preventing data from being written and erased in regions where data is not supposed to be written, even at smaller track widths.

[Second Embodiment]

Now, description will be given of a thin-film magnetic head and a method of manufacturing the same according to a second embodiment of the present invention.

Figures 11A, 11B:
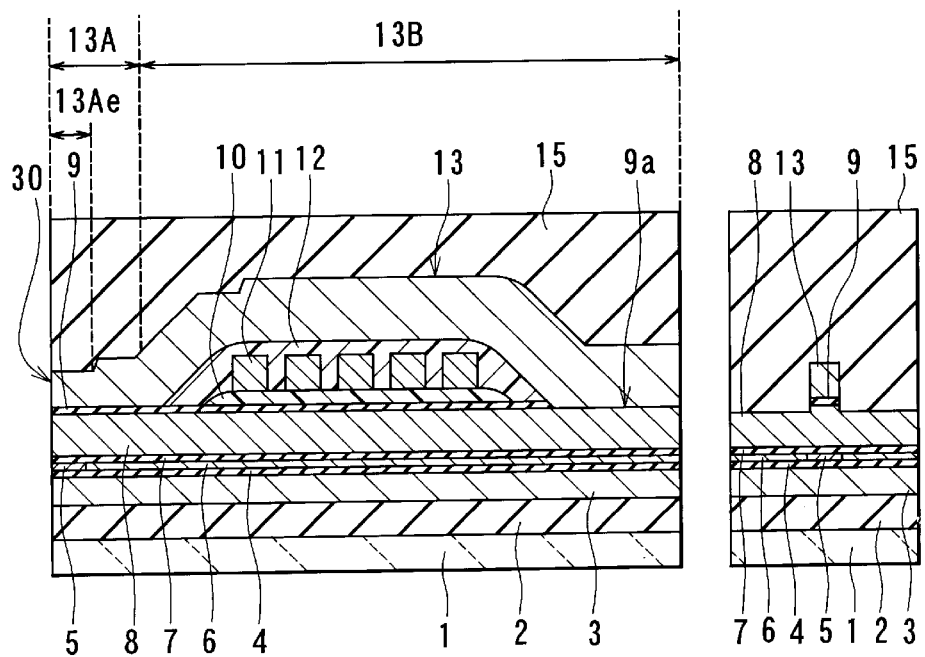
FIGS. 11A and 11B are cross-sectional views of a thin-film magnetic head according to a second embodiment of the present invention.
Figure 12:
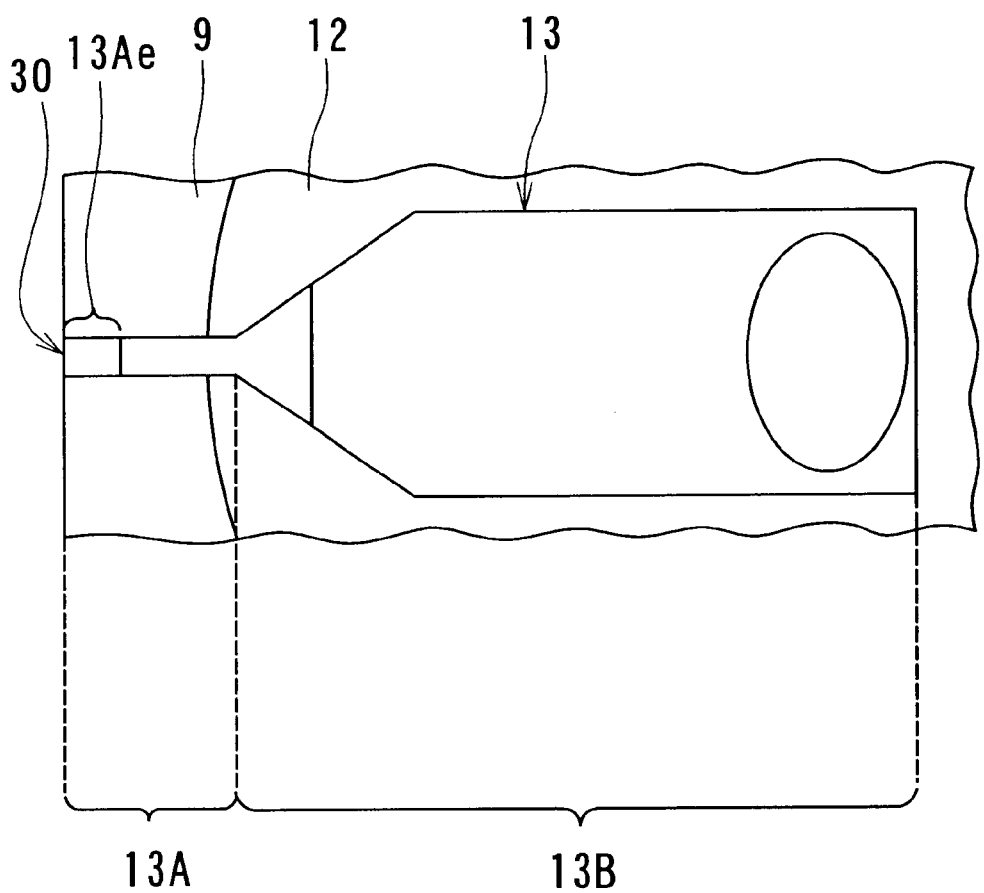
FIG. 12 is a plan view showing the shape of a top pole layer according to the second embodiment of the present invention.
Figure 13:
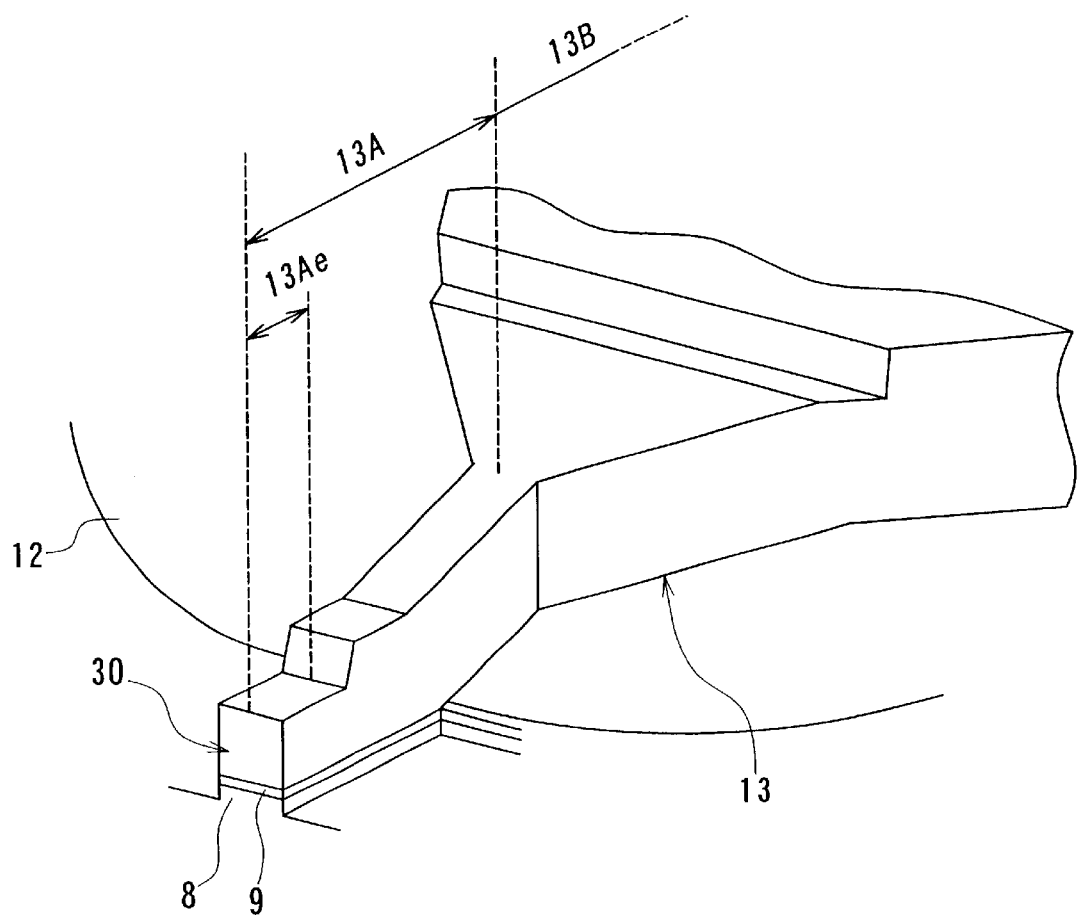
FIG. 13 is a perspective view showing the shape of the top pole layer according to the second embodiment of the present invention.

Initially, the configuration of the thin-film magnetic head according to the present embodiment will be described with reference to FIGS. 11A, 11B, 12, and 13. FIGS. 11A and 11B are cross-sectional views of the thin-film magnetic head according to the present embodiment. FIG. 11A shows a cross section orthogonal to an air bearing surface, and FIG. 11B shows a cross section of pole portion parallel to the air bearing surface. FIG. 12 is a plan view showing the shape of a top pole layer in the present embodiment. FIG. 13 is a perspective view showing the shape of the top pole layer in the present embodiment.

As shown in FIGS. 11A, 11B, 12, and 13, a top pole layer 13 of the present embodiment makes two steps of change in thickness. More specifically, the thickness of the top pole layer 13 in an area extending from a position halfway through the spreading part of its second portion 13B to an side closer to an air bearing surface 30 is smaller than that of the other area. Besides, the present embodiment is identical to the first embodiment in that the thickness of a first portion 13A of the top pole layer 13 in a region 13Ae is smaller than that of the other part of the top pole layer 13 adjacent to this region 13Ae. The region 13Ae extends from the air bearing surface 30 to a predetermined position.

Reference is now made to FIGS. 14A–19A and FIGS. 14B–19B to describe the method of manufacturing the thin-film magnetic head according to the present embodiment. FIGS. 14A–19A are cross sections each orthogonal to the air bearing surface. FIGS. 14B–19B are cross sections of the pole portions each parallel to the air bearing surface.

The steps of the method of manufacturing the thin-film magnetic head of the present embodiment that are taken until the top pole layer 13 yet to be etched is formed are similar to those of the first embodiment.

In the present embodiment, as shown in FIGS. 14A and 14B, the second portion 13B of the top pole layer 13 is then covered with an etching mask 21 made of a photoresist over an area that extends from a position halfway through its spreading part to the side farther from the air bearing surface 30.

Next, as shown in FIGS. 15A and 15B, the write gap layer 9 and a part of the bottom pole layer 8 closer to the write gap layer 9 are etched by dry etching using an etching mask. Here, the first portion 13A of the top pole layer 13 that is not covered by the etching mask 21 is used as the mask. In this case, for example, reactive ion etching is used for etching the write gap layer 9, and ion beam etching is used for etching the bottom pole layer 8. This etching step corresponds to the trimming step of the present invention.

By the etching described above, in a region where the first portion 13A of the top pole layer 13 and the bottom pole layer 8 are opposed to each other with the write gap layer 9 in between, a trim structure is formed, that is a structure in which the first portion 13A, the write gap layer 9, and at least a part of the bottom pole layer 8 closer to the write gap layer 9 have an equal width. At the same time, the top pole layer 13 is partially etched at its top surface over a region that extends from the air bearing surface 30 to the end of the etching mask 21 closer to the air bearing surface 30. As a result, the thickness in this region becomes smaller than that of the other part of the top pole layer 13.

Next, as shown in FIGS. 16A and 16B, the etching mask 21 is removed. Then, as shown in FIGS. 17A and 17B, the top pole layer 13 is covered with an etching mask 22 made of a photoresist over an area that extends from a predetermined position (a position to be the thickness changing position) in the first portion 13A to the side farther from the air baring surface 30. The predetermined position is the same as in the first embodiment.

Next, as shown in FIGS. 18A and 18B, a part of the first portion 13A of the top pole layer 13 that is not covered by the etching mask 22 is etched by dry etching using an etching mask. This etching is effected, for example, by ion beam etching.

By the etching described above, the first portion 13A of the top pole layer 13 is partially etched at its top surface over the region 13Ae which extends from the air bearing surface 30 to the predetermined position. As a result, the thickness in the region 13Ae becomes smaller than the thickness of the other part of the top pole layer 13 adjacent to this region 13Ae. The ratio of the thickness of the first portion 13A in the region 13Ae to the thickness of the other part of the top pole layer 13 adjacent to the region 13Ae (pole portion thickness ratio) is the same as in the first embodiment.

Next, as shown in FIGS. 19A and 19B, the etching mask 22 is removed. Then, as shown in FIGS. 11A and 11B, a protective layer 15 is formed over the entire surface. The surface is flattened, and pads (not shown) for electrodes are formed thereon. Finally, lapping of the slider including the foregoing layers is performed to form the air bearing surfaces 30 of the read head and the write head. The thin-film magnetic head according to the present embodiment is thus completed.

The remainder of the configuration, functions and effects of the second embodiment are similar to those of the first embodiment.

[Third Embodiment]

Now, description will be given of a thin-film magnetic head and a method of manufacturing the same according to a third embodiment of the present invention.

The thin-film magnetic head according to the present embodiment has the same configuration as that of the second embodiment, or as shown in FIGS. 11A and 11B.

Figures 20A, 20B:
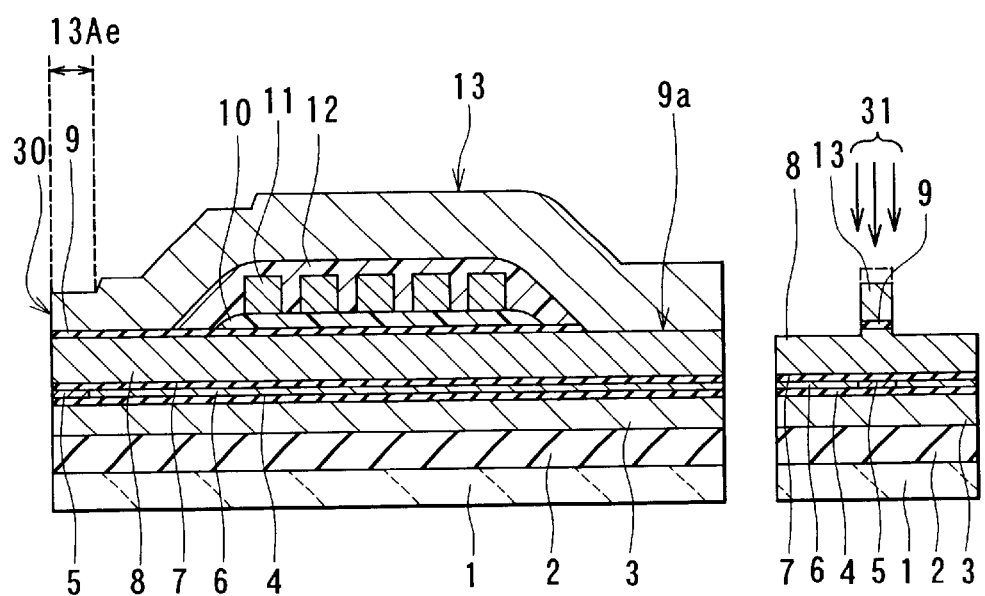
FIGS. 20A and 20B are cross-sectional views for explaining a step in a method of manufacturing a thin-film magnetic head according to a third embodiment of the present invention.
Figure 21:
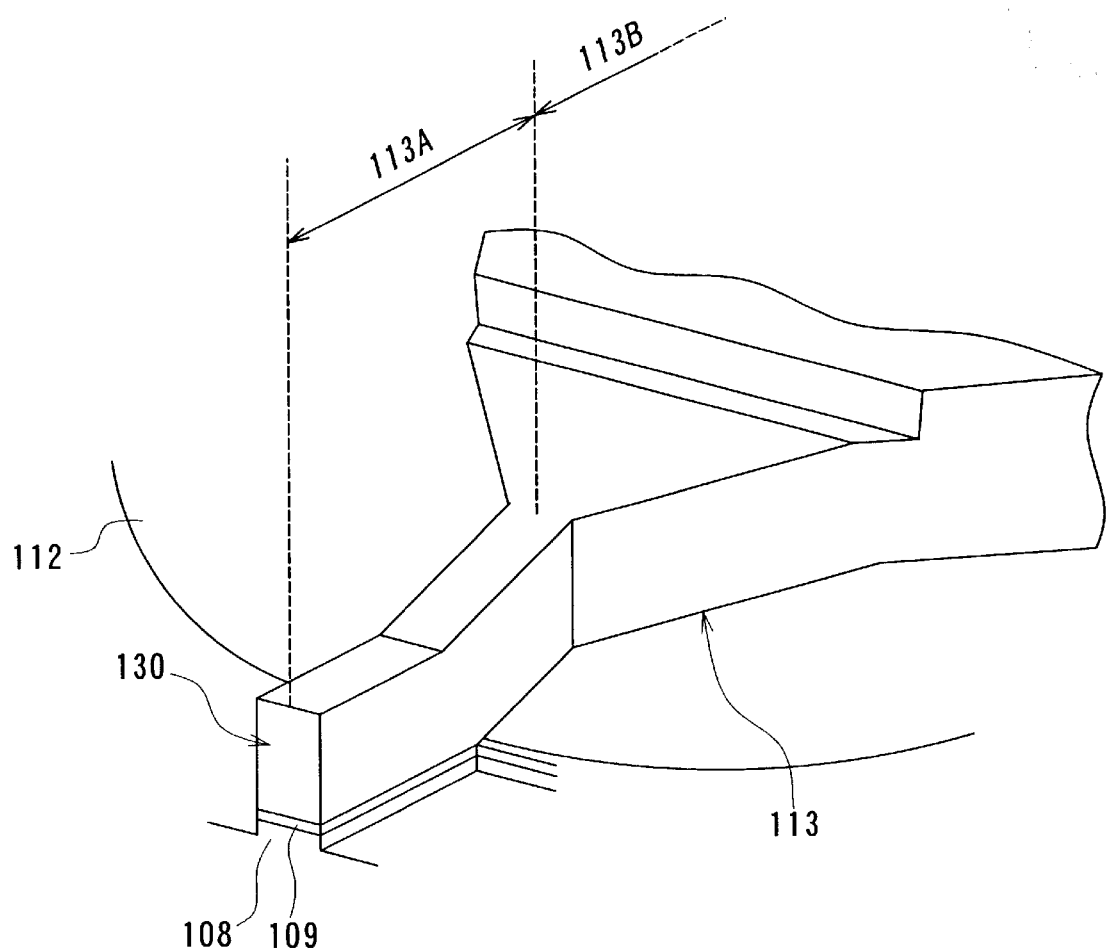
FIG. 21 is a perspective view showing an example of the structure in the vicinity of the pole portions of a write head.

Reference is now made to FIGS. 20A and 20B to describe the method of manufacturing the thin-film magnetic head according to the present embodiment. Here, FIG. 20A shows a cross section orthogonal to the air bearing surface, and FIG. 20B shows a cross section of the pole portions parallel to the air bearing surface.

The steps of the method of manufacturing the thin-film magnetic head of the present embodiment that are taken until the etching mask 21 is removed after the trimming step are similar to those of the second embodiment.

In the present embodiment, as shown in FIGS. 20A and 20B, the first portion 13A of the top pole layer 13 is then partially etched at its top surface over a region 13Ae that extends from the air bearing surface 30 to a predetermined position. This is effected by local etching using no etching mask, i.e., etching using a focused ion beam 31. The predetermined position is the same as in the first embodiment. As a result, the thickness in the region 13Ae becomes smaller than the thickness of the other part of the top pole layer 13 adjacent to this region 13Ae. The ratio of the thickness of the first portion 13A in the region 13Ae to the thickness of the other part of the top pole layer 13 adjacent to the region 13Ae (pole portion thickness ratio) is the same as in the first embodiment.

Next, as shown in FIGS. 11A and 11B, a protective layer 15 is formed over the entire surface. The surface is flattened, and pads (not shown) for electrodes are formed thereon. Finally, lapping of the slider including the foregoing layers is performed to form the air bearing surfaces 30 of the read head and the write head. The thin-film magnetic head according to the present embodiment is thus completed.

The remainder of the configuration, functions and effects of the second embodiment are similar to those of the second embodiment.

The present invention is not limited to the foregoing embodiments but is susceptible of various modifications. In the foregoing embodiments, for example, the thin-film magnetic heads are disclosed, comprising the MR element for reading formed on the base body and the induction-type electromagnetic transducer for writing stacked on the MR element. Alternatively, the MR element may be stacked on the electromagnetic transducer.

That is, the induction-type electromagnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing toward the bottom pole layer with a recording gap film in between.

The invention may be applied to a thin-film magnetic head dedicated to writing that has an induction-type electromagnetic transducer only or to a thin-film magnetic head performing writing and reading through an induction-type electromagnetic transducer.

As has been described, in the thin-film magnetic head or the method of manufacturing the same according to the present invention, the second magnetic layer is formed so that the thickness of the first portion in the region extending from the end of the first portion located in the medium facing surface to a predetermined position is made smaller than the thickness of the other part of the second magnetic layer adjacent to that region. Therefore, according to the present invention, it becomes possible to increase the thickness of the second magnetic layer in the portions other than the above-mentioned region while reducing the thickness of the first portion in the medium facing surface. As a result, according to the present invention, it is possible to prevent magnetic flux being saturated in the middle of the magnetic path and to prevent data from being written and erased in regions where data is not supposed to be written, even at smaller track widths.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising: a medium facing surface that faces toward a recording medium; a first magnetic layer and a second magnetic layer magnetically coupled to each other and including pole portions that are opposed to each other and placed in regions of said magnetic layers on a side of the medium facing surface; a gap layer provided between said pole portions of said first and second magnetic layers; a thin-film coil at least a part of which is placed between said first and second magnetic layers and insulated from said first and second magnetic layers; an insulating layer covering said thin-film coil; and a substrate, wherein:

said first and second magnetic layers, said gap layer, said thin-film coil, and said insulating layer are stacked on said substrate, said first magnetic layer being located closer to said substrate than is said second magnetic layer, said insulating layer is formed to gradually rise from a level of a top surface of said gap layer, an end of said insulating layer closer to the medium facing surface defines a throat height, said second magnetic layer is disposed on said gap layer and said insulating layer, and a top surface of said second magnetic layer is thereby bent at a point near the end of said insulating layer closer to said medium facing surface, the point at which the top surface of said second magnetic layer is bent is located closer to said medium facing surface than the end of said insulating layer closer to said medium facing surface, said second magnetic layer has: a first portion having an end located in said medium facing surface, having a width that is constant and equal to a write track width, and including said pole portion; and a second portion being coupled to the other end of said first portion and including a yoke portion, the thickness of said first portion in a region extending from said end located in said medium facing surface to a predetermined position is smaller than the thickness of the other part of said second magnetic layer adjacent to said region, and said region is located closer to said medium facing surface than the point at which the top surface of said second magnetic layer is bent.

2. The thin-film magnetic head according to claim 1, wherein the thickness of said first portion in said region falls within a range of 30% to 95% the thickness of the other part of said second magnetic layer adjacent to said region.

3. The thin-film magnetic head according to claim 1, wherein said predetermined position is located within a range that extends from a position 0.5 μm away from said end of said first portion to the interface between said first and second portions.

4. The thin-film magnetic head according to claim 1, wherein said predetermined position is located within a range that extends from a position at a distance of one seventh the length of said first portion from said end of said first portion to the interface between said first and second portions.

5. The thin-film magnetic head according to claim 1, wherein at least a part of said pole portion of said first magnetic layer closer to said gap layer has a width equal to the width of said first portion.

* * * * *